Feb. 6, 1934.  L. C. DANIELS  1,946,313

TENSIONING DEVICE

Filed June 8, 1929

Inventor:
Leon C. Daniels,
by Charles W. Mullan
His Attorney

Patented Feb. 6, 1934

1,946,313

UNITED STATES PATENT OFFICE 1,946,313

TENSIONING DEVICE

Leon C. Daniels, Pittsfield, Mass., assignor to General Electric Company, a corporation of New York Application June 8, 1929. Serial No. 369,367

8 Claims. (Cl. 242—156)

My invention relates to tensioning devices, more particularly to tensioning devices for coil winding machines, and has for its object the provision of an improved device of this character.

My invention is particularly useful in connection with tensioning devices employing a friction brake. It will be understood that in order to prevent fluctuation in the tension in the wire it is necessary to apply the brake uniformly.

In carrying out my invention in one form thereof, I provide a brake of the band type and control the brake band in response to the tension in the wire being drawn so that the arc of contact between the brake band and its drum is varied in accordance with the tension in the wire.

Figure 1:
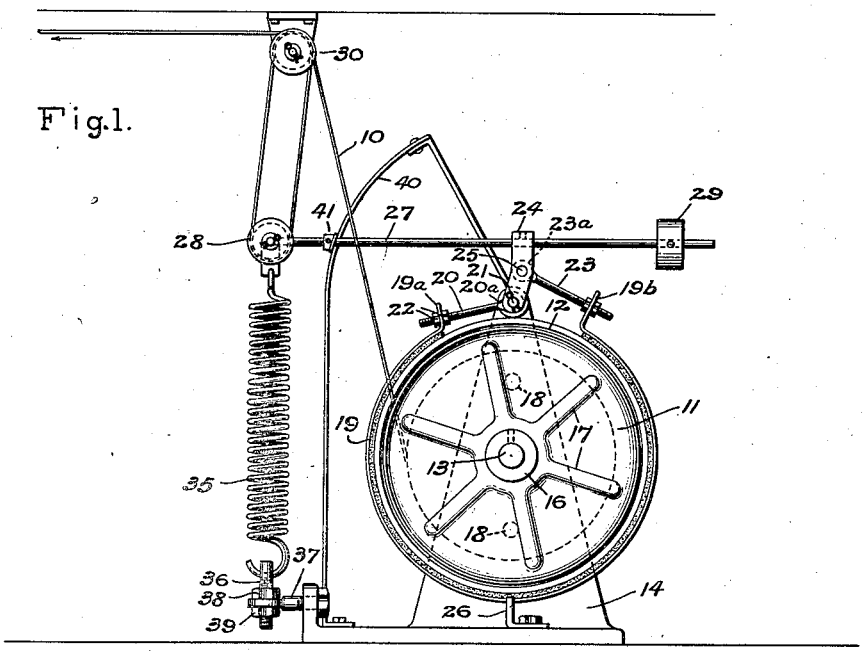
Figure 2:
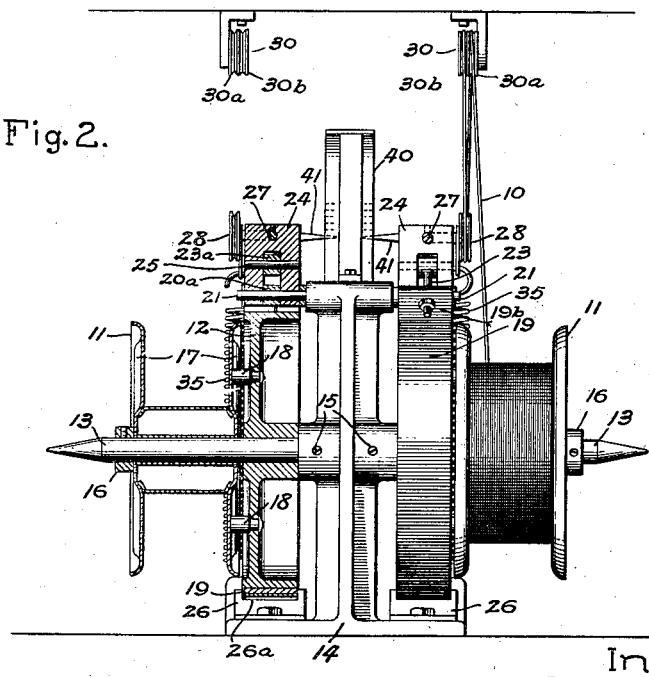

For a more complete understanding of my invention, reference should be had to the accompanying drawing in which Fig. 1 is an end elevation of a tensioning device embodying my invention; and Fig. 2 is a side elevation, partly in section, of the tensioning device shown in Fig. 1.

Referring to the drawing, I have shown my invention in one form in connection with the winding of electrical coils, although obviously it may be used in connection with the winding of various other materials, such as fabrics. The insulated electrical conductor or wire 10 is drawn from a supply spool 11 and wound up into an electrical coil by means of a suitable winding machine (not shown). It will be understood that during the winding operation, the winding machine will draw the wire 10 at the desired speed from the spool 11 which will be allowed to rotate. The tensioning device may be and, as shown, is provided with two spools 11 from which wire may be drawn to the winding machine so that either one coil may be formed in the winding machine by wire drawn from either spool alone or two coils may be formed simultaneously by wire drawn from both spools. The operation of the device with respect to either spool, however, is the same. Only one reel of wire, that at the right of the tensioning device, as viewed in Fig. 2, has been shown.

It will be understood that during the winding operation it is desirable to maintain the wire 10 under a suitable tension so that it will be wound into a compact coil. In order to maintain the wire under tension, a braking force is applied to the spool 11 so as to retard its rotation. As shown, each spool is provided with a brake drum 12 mounted upon the spool supporting spindle 13. It will be observed that a single spindle 13 is provided for supporting both spools 11. This spindle is mounted upon the supporting base or standard 14 and is secured against movement by suitable set screws 15. Both spools and likewise their brake drums are mounted to rotate freely upon the spindle 13. A suitable collar 16 is provided on each end of the spindle 13 so as to secure the spools against lateral movement upon the spindle. It will be observed that each brake drum is positioned upon the spindle between its spool and the supporting standard 14 so that the drum is secured against lateral movement.

Each brake drum is caused to rotate with its spool during the winding operation. To this end, the end wall of each spool adjacent its drum is provided with radial ribs 17 with which a pair of pins 18 secured to the outer wall of the drum cooperates. Thus, it will be observed that as the spool 11 is rotated in a clockwise direction, as viewed in Fig. 1, the brake drum associated therewith likewise will be rotated in a clockwise direction.

Each brake drum 12 is provided with a resilient brake band 19. Preferably, this band will comprise an inner lining formed from a suitable material such as leather, felt or asbestos, and with an outer metallic lining which will serve to reinforce the inner lining. Preferably, this outer lining will be formed from steel. As shown, each brake band substantially surrounds the entire outer periphery of its drum. One end 19a of the band is mechanically connected to the standard 14 by means of a rod 20. The rod 20 is provided at one end with an eyelet 20a, which in the assembled device is received by a pin or spindle 21 projected laterally from the standard 14, and at its other end with a screw threaded portion. This portion is received in a suitable aperture provided in an outwardly projecting end portion 19a of the band and is provided with a pair of nuts 22 threaded on opposite sides of the end portion so as to secure the band. The other end 19b of the brake band is provided with a securing rod 23 which is similar to the rod 20. The eyelet end 23a of this rod, however, is connected to a suitable lever or knuckle 24 by means of a pin 25. This lever is pivotally mounted upon the standard 14 by means of the projecting pin 21.

It will be observed that the rod 23 is mechanically connected with this lever at a point between the pivot 21 and the free end of the lever. By reason of this construction, clockwise movement of the lever 24, as viewed in Fig. 1, effects the release of the brake band, while counterclockwise movement of the lever effects the application of the band. It will be observed that the brake band 19 practically floats when released about the drum 12. A suitable guide 26 provided with a notch 26a serves to maintain the brake band in alignment with its drum.

Secured rigidly to the end of the brake lever 24 at right angles to the brake lever and the axis of the spindle is a brake operating arm 27. On one end of the arm 27 is an idler sheave 28, while on the other end of the arm is a counterweight 29 provided to counter-act the weight of the sheave and balance the arm about the pivot 21. A double sheave 30 is mounted, preferably above the sheave 28, on a fixed support which may be a portion of the winding machine. The wire 10 in passing from the spool 11 to the winding machine is passed over the sheave portion 30a of the sheave 30, thence is led downwardly to pass over the sheave 28 from whence it is passed over the sheave portion 30b to the winding machine. Of course, two single sheaves may be substituted for the double sheave 30. The arrangement of the spool 11, the arm 27 and the sheaves 28 and 30 is such that a force is applied to the arm 27 by reason of the tension in the wire which force tends to move the operating arm and lever about the pivot 21 in a clockwise direction, as viewed in Fig. 1. It will be observed, therefore, that in the operation of the device an increase in tension in the wire 10 will swing the lever 24 so as to move the end 19b of the brake band from its drum. This operation will decrease the arc of contact between the band and its drum and thus will decrease the frictional braking force.

As shown, a helical tension spring 35 is attached to the sheave end of the operating arm 27 so as to apply a force in a direction to increase the braking force. The fixed end of this spring is secured to a rod 36 which extends through an aperture in the member 37 projected from the base 14. Nuts 38 and 39 are provided on the rod 36 on opposite sides of the projecting member, and by adjusting these nuts the rod can be adjusted to vary the tension of the spring as desired.

By reason of this construction, when the tension in the wire decreases, the lever 24 is swung in a counterclockwise direction to increase the frictional braking force. It will be observed, therefore, that as the wire is being drawn by the winding machine, the arc of contact between the brake band and its drum and hence the braking force will depend upon the tension in the wire 10. This is an important feature of my invention in that a gradual change in the applied braking force is effected. Thus, there will be no tendency for the tension in the wire to fluctuate.

The operation of the tensioning device is as follows: Let it be assumed that the winding machine is idle and that there is no tension in the wire 10. The brake band 19 under these conditions will be clamped tightly about its drum 12 under the influence of the tension spring 35. When the winding machine is set in motion a tension will be set up in the wire 10. This tension, which will gradually increase, will cause the brake operating arm 27 together with the lever 24 to swing in a clockwise direction, as viewed in Fig. 1, against the increasing tension of the spring 35. This operation will effect a decrease in the braking pressure until the tension in the wire 10 is sufficient to cause rotation of the sleeve 11 and its drum 12 against the frictional resistance of the brake band.

The guide 26 performs an important function when the band is released in that it serves to support the weight of the band and the link mechanism comprising the links 20 and 23. This is important when winding fine wire because the frictional forces which otherwise would develop by reason of the weight of the band etc., would be too great for the wire. It will be observed that the band by reason of its resiliency will spring away from the drum as it is being released so that eventually when the band has been released to a predetermined extent both of its ends will bear upon the drum. A further expansion of the band will cause it to drop to such an extent that its central portion will rest on the guide 26, the guide thereby serving both as a support and as a fulcrum. Upon continued release of the band the end portion 19a will leave the surface of the drum. This is due to the fact that the band when released will act as a resilient lever and thus raise the end portion 19a from the drum. As a result of this operation the drum will be permitted to rotate freely.

It will be evident that the tension in the wire 10 will always be substantially equal to one half of the tension of the spring 35. Moreover, it will be evident that a balance will always be maintained between the turning moment produced by the tension in the wire acting about the center of the spindle 13 and the braking moment produced by the tension of the spring acting through the arm 27, the lever 24 and the rod 23 on the brake band. Therefore, the tension can be adjusted to suit various sizes of wires simply by adjusting the tension of the spring 35.

When the winding machine is stopped the inertia of the spool 11 together with that of the wire wound thereon is overcome by the increase in the braking force effected by the decrease in the tension in the wire. Therefore as the winding machine comes to rest, the arc of contact between the band 19 and its drum 12 will increase until finally the drum will be gripped by the band throughout its entire length. It is to be noted that as the spool 11 is being brought to rest, the arm 27 in swinging downwardly in a counter-clockwise direction by reason of the reduction of tension in the wire will take up any slack in the wire so as to maintain the tension nearly at its normal value. Thus, the device is ready for re-starting the winding machine.

It also is to be noted that the deflection or movement of the operating arm 27 is directly proportional to the tension in the wire. Thus, the deflection of this arm is a direct measure of the wire tension. This feature of my invention is important in that a coil can be wound conveniently with a preselected constant tension. In order that the tension in the wire may be read directly, I have provided a suitable indicator. As shown this indicator comprises a fixed scale 40, suitably graduated to indicate tension, and a pointer 41, secured to each arm 27 for cooperating with the scale. It will be observed that since the deflection of the arm is directly proportional to the tension in the wire, the indicator will read directly in terms of the wire tension.

What I claim as new and desire to secure by Letters Patent of the United States is:

1. A tensioning device for coil winding machines comprising in combination with a spool from which the material being wound is drawn, a brake drum for said spool, a resilient metallic brake band substantially surrounding said brake drum and being mounted to float freely about said drum, lever mechanism responsive to the tension in the material being drawn for moving a portion of said brake band laterally with respect to said drum whereby the arc of contact between said band and said drum is varied to provide for a gradual change in the applied braking force and a fulcrum arranged to engage said resilient brake band at a point between its ends when said portion of said band has been moved laterally from said drum a predetermined distance.

2. A tensioning device for a coil winding machine provided with a brake drum driven by the material being wound comprising a resilient metallic brake band substantially surrounding said brake drum, a standard, means securing one end of said brake band to said standard, a rigid lever pivotally mounted on said standard connected to the other end of said brake band for moving said end portion away from and toward said drum, a second rigid lever mechanically secured to said first lever for operating it, a tension spring connected to said second lever arranged to operate said lever so as to apply a braking force to said drum, and a member on said lever substantially at the point of attachment of said spring over which said material being wound passes so that the lever is moved by the tension in said material against the force of said spring to control the braking force in accordance with the tension in said material.

3. A tensioning device for coil winding machines comprising in combination with a spool from which the material being wound is drawn, a brake drum for said spool, a resilient metallic brake band substantially surrounding said brake drum, means for securing said brake band at one end, a pivoted lever secured to the other end of said resilient brake band whereby the arc of contact between said brake band and its drum is varied so as to provide for a gradual change in the applied braking force in response to the operation of said lever, an operating arm for said lever, a spring connected to one end of said operating arm for applying a braking force to said arm, a sheave over which the material passes from said spool and a second sheave mounted upon one end of said arm over which material passes from said first sheave whereby said arm is moved against the force of said spring in accordance with the tension in said material.

4. A tensioning device for coil winding machines comprising in combination with a spool from which the material being wound is drawn, a brake drum for said spool, a resilient brake band cooperating with said drum, means supporting said band to float about said drum, means responsive to the tension in the material being drawn from said spool for operating said band to move a portion thereof away from and toward said drum so that the arc of contact between said band and said drum is determined by the tension in said material and a fulcrum arranged to engage said resilient brake band at a point between its ends when said portion of said band is moved away from said drum a predetermined distance.

5. A tensioning device for coil winding machines and the like comprising in combination with a spool from which the material being wound is drawn, a brake drum for said spool, a resilient metallic brake band substantially surrounding said drum and mounted to float freely about said drum, means securing one end of said brake band, means dependent upon the tension in said material for moving the other end of said band laterally with respect to said drum so that the arc of contact between said band and said drum is determined by the tension in said material and a fulcrum arranged to engage said resilient brake band at a point between its ends when said other end of said band has been moved laterally from said drum a predetermined distance.

6. A tensioning device for coil winding machines and the like comprising in combination with a spool from which the material being wound is drawn, a brake drum for said spool, a resilient metallic brake band substantially surrounding said brake drum, means securing said brake band at one end, a lever having a portion projecting therefrom substantially at right angles to the body of said lever, means fixedly pivoting the end of said projecting portion, means mechanically connecting the other end of said brake band to said projecting portion intermediate its length so that the arc of contact between said band and said drum is varied in response to the operation of said lever about said pivot, a resilient member attached to said lever and arranged to apply a braking force, and a member on said lever positioned substantially at the point of attachment of said resilient member over which said material is passed so that said lever is moved against the force of said resilient means in accordance with the tension in said material.

7. A tensioning device for coil winding machines and the like comprising in combination with a spool from which the material being wound is drawn, a brake drum for said spool, a resilient metallic brake band substantially surrounding said brake drum, an operating lever connected to control the application of said brake band, a sheave on said lever over which the material being wound is passed from said spool so that the arc of contact between said brake band and said drum is varied in accordance with the tension in said material, a second sheave over which said material is passed from said first sheave and a tension spring attached to said lever so as to apply a braking force substantially in the direction of movement of the material between said sheaves.

8. A tensioning device for coil winding machines and the like comprising in combination with a spool from which the material being wound is drawn, a brake drum for said spool, a resilient brake band substantially surrounding said brake drum and mounted so that it can expand freely therefrom, means for pivotally securing one end of said brake band, means for controlling the other end of said brake band to move it to applied and releasing positions and thereby control the arc of contact between said brake band and said drum, and a fulcrum between the ends of said resilient band and cooperating with said band so that when said other end is moved to release said drum and said band has been released to a predetermined degree, said band in expanding will engage said fulcrum, whereupon further releasing movement of said other end causes said pivotally secured end to disengage said drum to permit said drum to rotate freely.

LEON C. DANIELS.